United States Patent
Tan (10) Patent No.: US 9,269,402 B1
(45) Date of Patent: Feb. 23, 2016

(54) BVCM HOLD DOWN APPARATUS TO PREVENT PIVOT BEARING DAMAGE AT TVCM INSTALLATION IN DISK DRIVE ASSEMBLY

(75) Inventor: Jit Han Tan, Petaling Jaya (MY)

(73) Assignee: Western Digital Technologies, Inc., Irvine, CA (US)

( * ) Notice: Subject to any disclaimer, the term of this patent is extended or adjusted under 35 U.S.C. 154(b) by 1024 days.

(21) Appl. No.: 13/298,979

(22) Filed: Nov. 17, 2011

(51) Int. Cl.
| | |
|---|---|
| *G11B 33/12* | (2006.01) |
| *G11B 33/14* | (2006.01) |
| *G11B 5/105* | (2006.01) |
| *G11B 5/54* | (2006.01) |
| *G11B 5/55* | (2006.01) |
| *G11B 23/00* | (2006.01) |

(52) U.S. Cl.
CPC ............. *G11B 33/128* (2013.01); *G11B 5/105* (2013.01); *G11B 5/54* (2013.01); *G11B 5/5569* (2013.01); *G11B 23/00* (2013.01); *G11B 33/123* (2013.01); *G11B 33/127* (2013.01); *G11B 33/14* (2013.01); *Y10T 29/49025* (2015.01); *Y10T 29/53165* (2015.01); *Y10T 29/53252* (2015.01); *Y10T 29/53261* (2015.01)

(58) Field of Classification Search
CPC ........ G11B 5/54; G11B 5/5569; G11B 23/00; G11B 33/123; G11B 33/128; G11B 33/14; G11B 33/127; G11B 5/105; Y10T 29/49025; Y10T 29/53165; Y10T 29/53252; Y10T 29/53261
See application file for complete search history.

(56) References Cited

U.S. PATENT DOCUMENTS

| | | | |
|---|---|---|---|
| 5,966,271 A * | 10/1999 | Fahley | Y10T 29/49025 |
| 6,877,215 B2 * | 4/2005 | Pfeiffer | G11B 23/00 |
| 7,222,410 B1 * | 5/2007 | Klassen et al. | G11B 5/5569 |

FOREIGN PATENT DOCUMENTS

JP        2004127505 A   *   4/2004

* cited by examiner

*Primary Examiner* — A. Dexter Tugbang (57) ABSTRACT

A device for preventing damage to a pivot bearing assembly during manufacture of a hard disk drive includes a first bottom voice coil motor (VCM) plate hold-down clamp configured to clamp down on a first exposed surface of a bottom VCM plate of the hard disk drive and a second bottom VCM plate hold-down clamp configured to clamp down on a second exposed surface of the bottom VCM plate. The first and second bottom VCM plate hold-down clamps are configured to prevent damage to the pivot bearing assembly during installation of the top VCM plate over the bottom VCM plate by clamping down on the bottom VCM plate with a force that is at least sufficient to prevent the bottom VCM plate from moving when the top VCM plate is installed over the bottom VCM plate.

9 Claims, 9 Drawing Sheets

(Prior Art)

BVCM HOLD DOWN APPARATUS TO PREVENT PIVOT BEARING DAMAGE AT TVCM INSTALLATION IN DISK DRIVE ASSEMBLY

BACKGROUND OF THE INVENTION

The Head-Disk Assembly (HDA) of a disk drive is typically assembled in a clean room environment. To ensure that the head-disk interface remain unencumbered and damage free, it is necessary to reduce the vibrations and drive noise generated by the pivot bearing cartridge of the Head Stack Assembly (HSA). Even low-level friction and noise generated by the pivot bearing may cause damage to the surface of a disk and/or to the read/write head(s), and result in the catastrophic failure of the disk drive. One of the primary causes of pivot bearing friction/noise is pivot bearing damage resulting from unwanted interference with other drive components during the drive assembly process. One source of such interference can be traced to the assembly process, particularly during assembly of the constituent components of the Voice Coil Motor (VCM).

Figure 2:
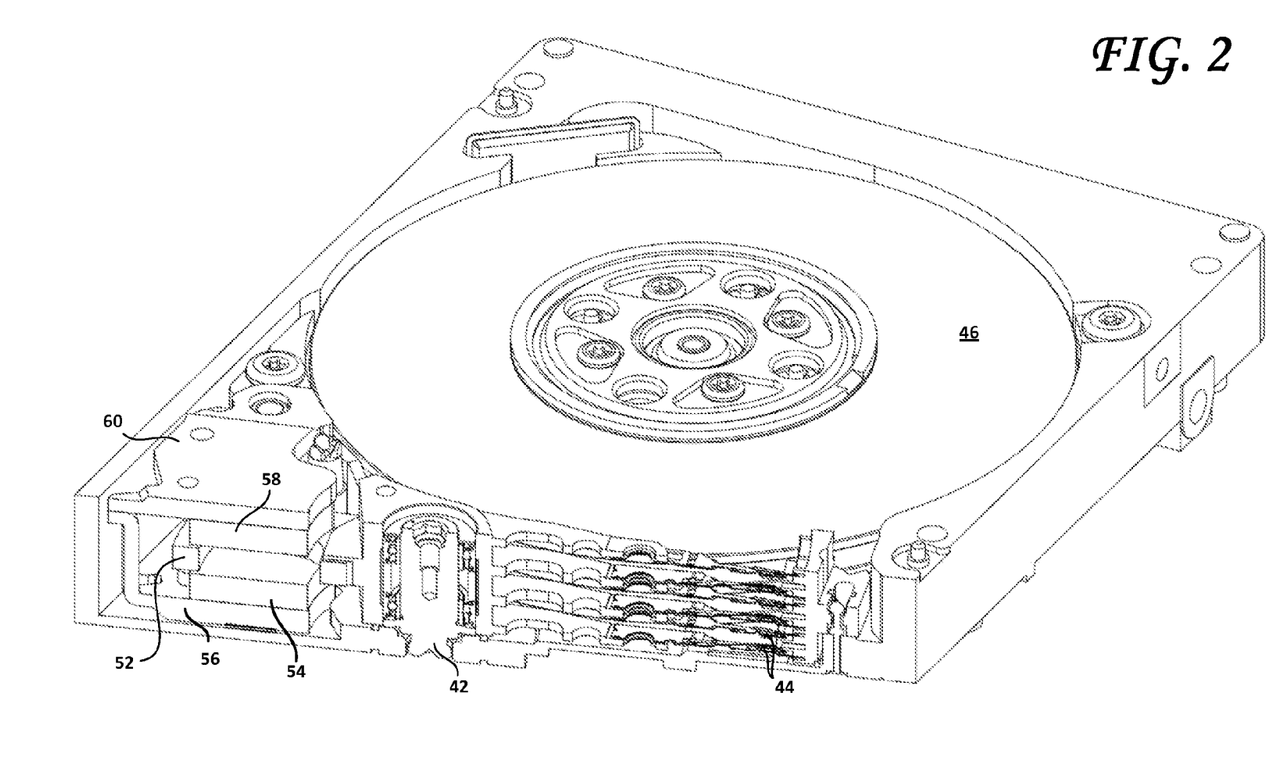
FIG. 2 shows a cross-sectional view of a Head Stack Assembly (HSA) in a Head Disk Assembly (HDA), showing a cut-away view of the pivot bearing cartridge and the top and bottom Voice Coil Motor (VCM) plates.
Figure 3:
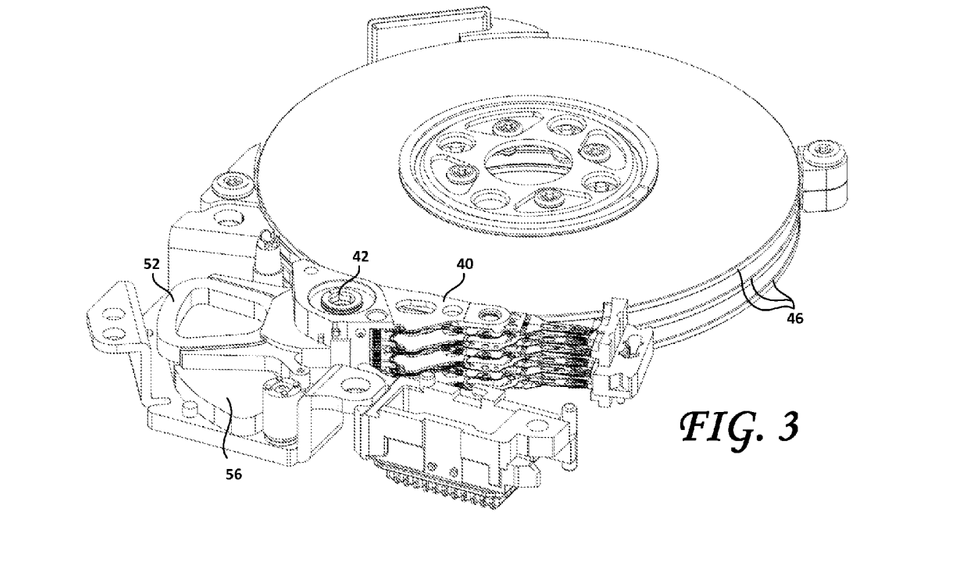
FIG. 3 is a cross-sectional view of a head stack in an HDA, with the top VCM plate removed.
Figure 4:
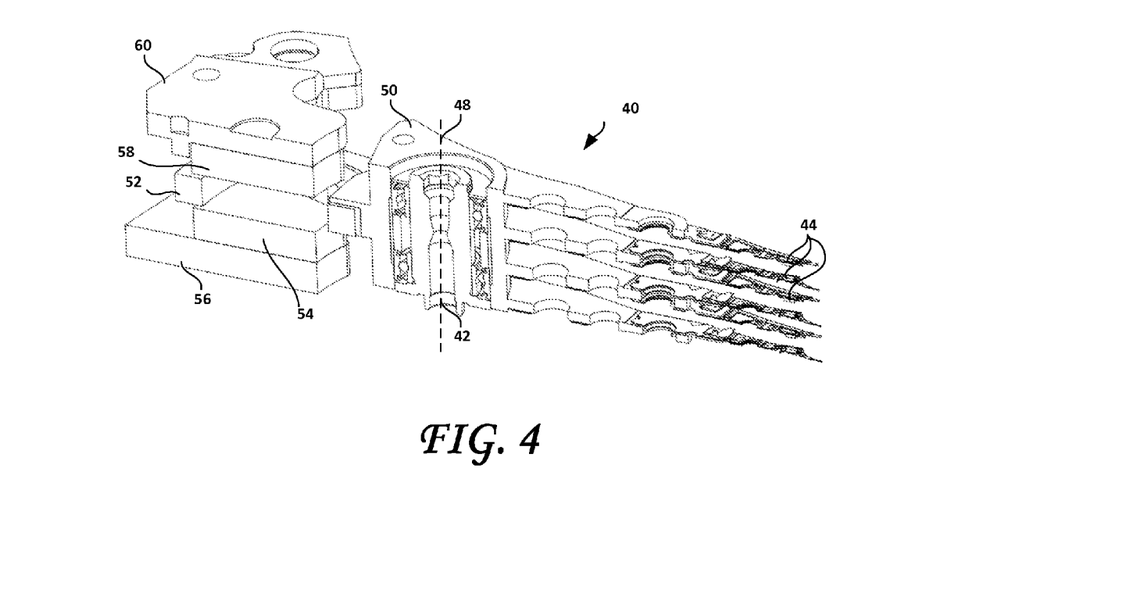
FIG. 4 is a cross-sectional view of a VCM sandwiched between the top VCM plate and the bottom VCM plate. Also shown is a cross-sectional view of the pivot bearing cartridge.

In a modern hard disk drive, and with reference to FIGS. 2, 3 and 4, the HSA 40 is pivotally secured to the base of the drive via a pivot-bearing cartridge 42 so that the read/write transducer(s) 44 at the distal end of the suspension assembly(ies) may be moved over the recording surface(s) of the disk(s) 46. The pivot-bearing cartridge 42 enables the HSA 40 to pivot, and includes a bearing cartridge and a pivot shaft that defines an axis 48 about which the actuator rotates when power is applied to the VCM. The "rotary" or "swing-type" actuator assembly rotates on the pivot bearing cartridge 42 between limited positions, and the coil assembly 52 that extends from one side of the body portion 50 of the actuator body of the HSA 40 is disposed between and interacts with a first permanent magnet 54 mounted to a bottom VCM plate 56 and a second permanent magnet 58 mounted to a top VCM plate 60 to form the VCM formed by the bottom VCM plate 56, the first permanent magnet 54, the coil assembly 52, the second permanent magnet 58 and the top VCM plate 60. In operation, when a driving voltage is applied to the VCM, torque is developed that causes the HSA 40 to pivot about the actuator pivot axis 48 and causes the read/write transducer(s) 44 to sweep radially over the disk(s) 46. Most modern drives use a feedback mechanism so that small changes in applied voltage are operative to position the read/write transducer(s) 44 precisely over the disk(s) 46.

During installation of the VCM, the bottom VCM plate 56 is disposed within the base of the HDA. The HSA is then pivotally fitted onto the base, such that the coil assembly 52 thereof is disposed at least partially over the bottom VCM plate 56. Thereafter, the top VCM plate 60 is lowered over the bottom VCM plate 56, thereby sandwiching the coil assembly 52 between the bottom and top VCM plates 56, 60. During that process, because of the strong permanent magnets 54, 58, a strong magnetic field is established between the first and second permanent magnets, the bottom VCM plate 56 (and its attached magnet 54) has tendency to be attracted towards the top VCM plate 60 as the top VCM plate 60 is lowered down towards the HDA to complete the VCM. As the bottom VCM plate 56 tilts upwards towards the top VCM plate 60, the bottom VCM plate 56's upper surface makes contact with the lower surface of the coil assembly 52 which, in turn, pushes and applies a moment to the actuator body 50, tilting the coil assembly 52 up and the read/write transducers(s) 44 down. This applied moment creates stress on the pivot bearing cartridge (i.e., between the pivot bearings and the pivot shaft), leading to damage of the pivot bearings. The extent of bearing damage is determined by measuring the pivot friction torque. This damage, as alluded to above, may cause unwanted vibration and noise and may even lead to drive failure.

The needs for ever-increasing performance improvement and data storage capacity have been met through increasing the track density and the number of disks in the disk pack and reducing the disk thickness and the spacing between the disks. The increasing number of disks in the disk pack, in particular, has engendered a corresponding increase in the number of actuator arms (four such actuator arms being shown in FIG. 4) on the head stack assembly 40. Moving a more massive HSA 40 while achieving short access times, in turn, requires a stronger magnetic force within the VCM to move the head stack across the disk(s) and to move the heads to and from the ramp load/unload positions within the disk drive assembly. Therefore, there is a need for tools and methods of ever increasing sophistication to overcome the pivot friction damage induced during installation of the top VCM plate 60. Indeed, there is a need to reduce pivot bearing damage caused during installation of the top VCM plate 60 while allowing high performance and high capacity product designs with strong magnetic attraction between the bottom VCM plate 56 and the top VCM plate 60.

Figure 1:
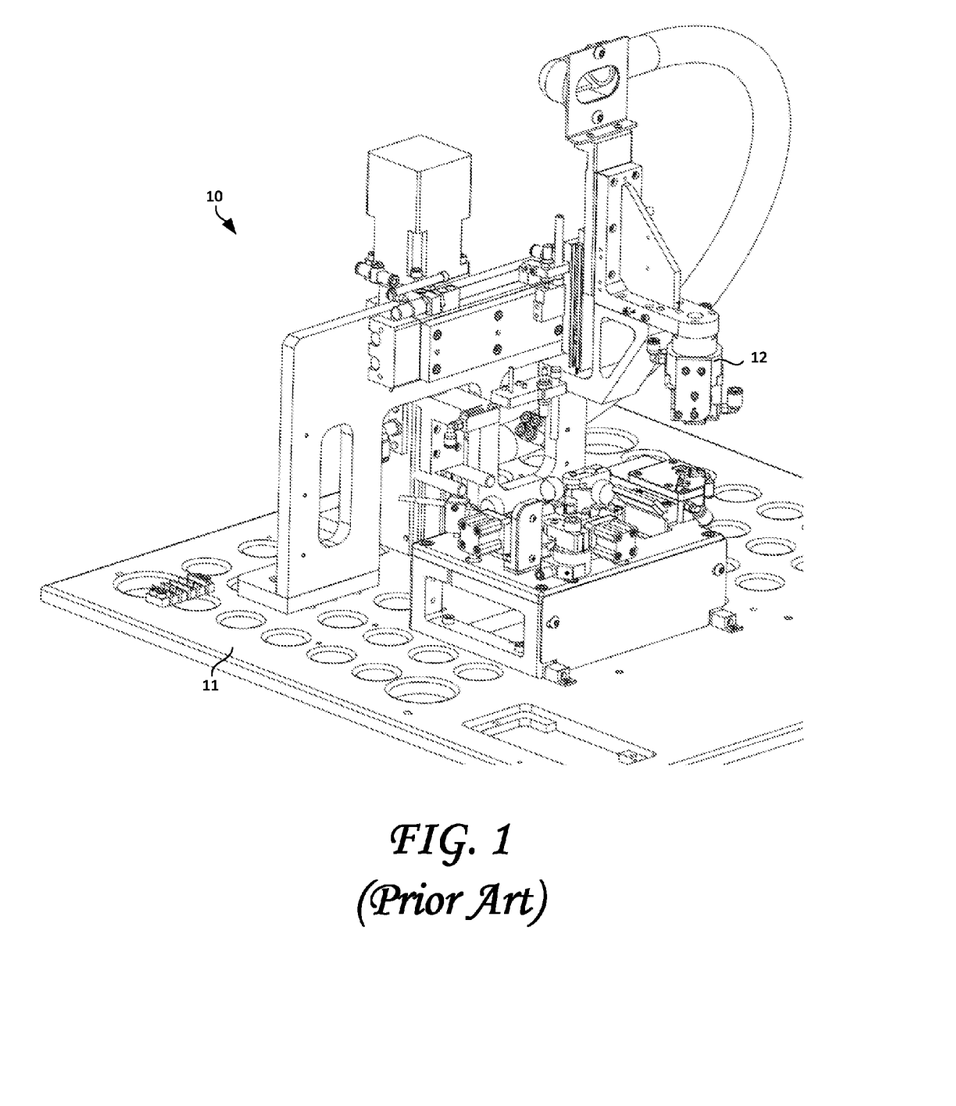
FIG. 1 shows a conventional hard drive assembly nest, used during the manufacture of hard disk drives.
Figure 5:
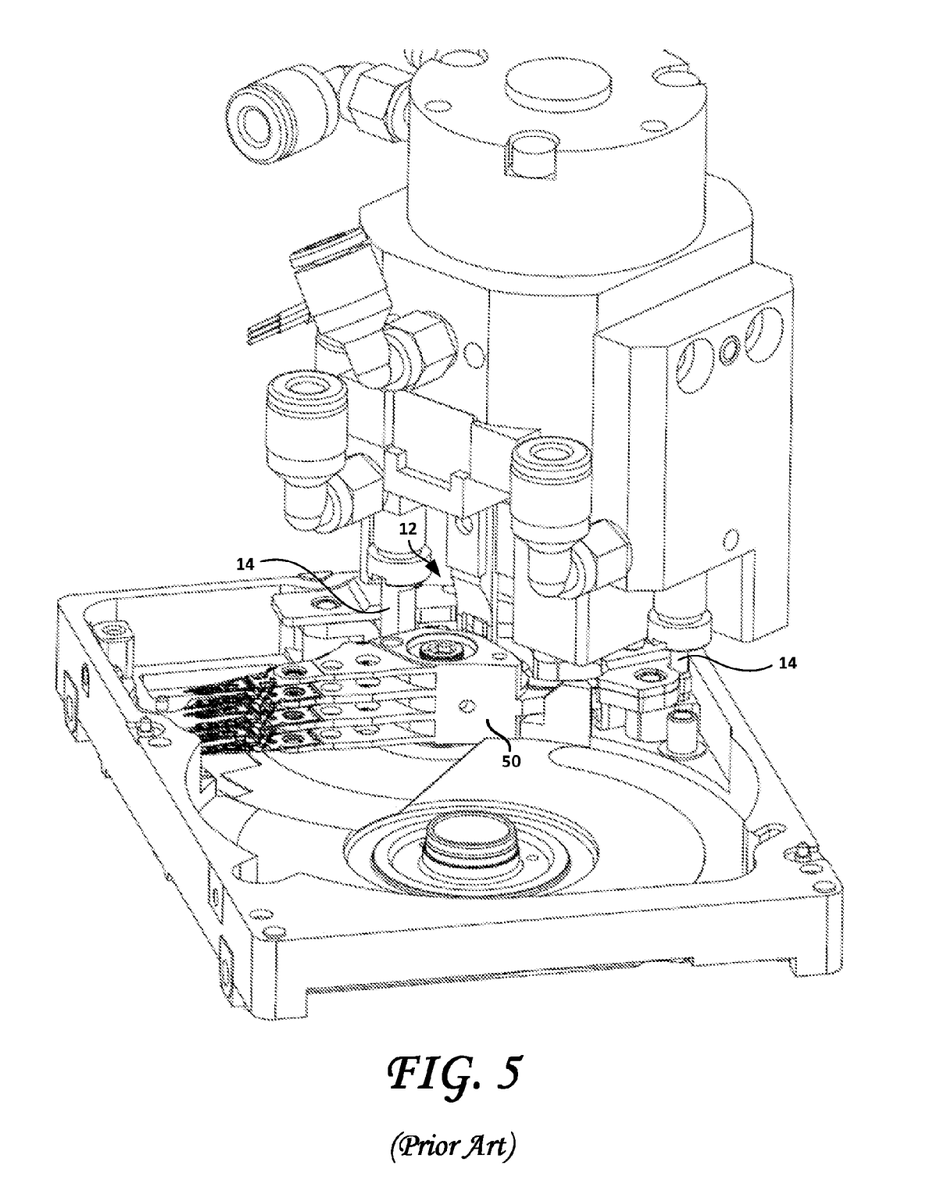
FIG. 5 shows a conventional bottom VCM hold-down mechanism integrated into a gripper assembly.
Figure 6:
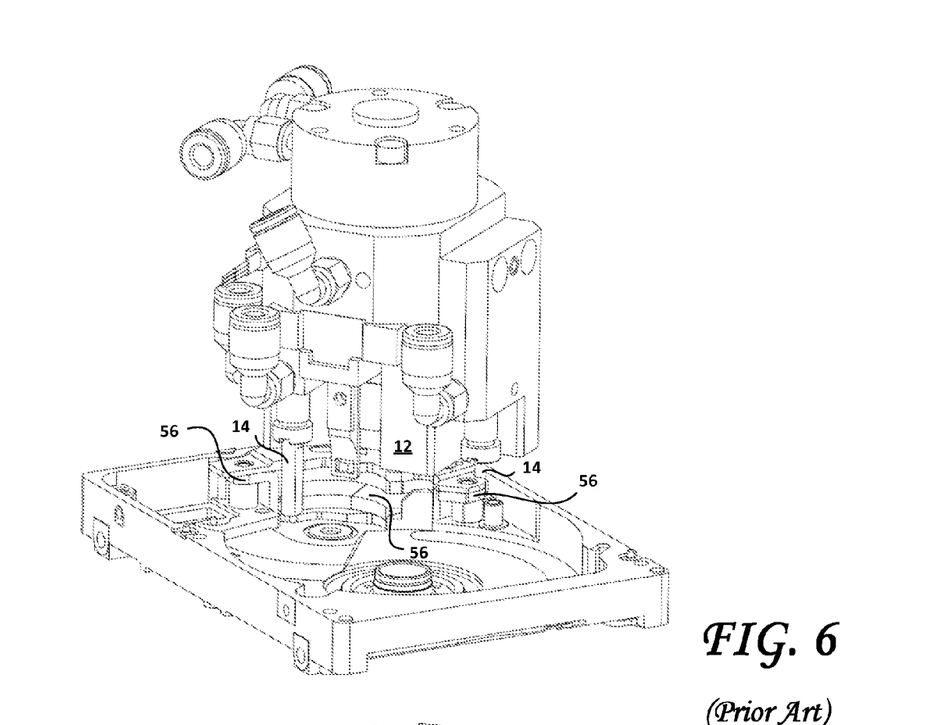
FIG. 6 shows a conventional bottom VCM hold-down mechanism and a Motor Base Assembly, with the HSA removed for clarity of illustration.
Figure 7:
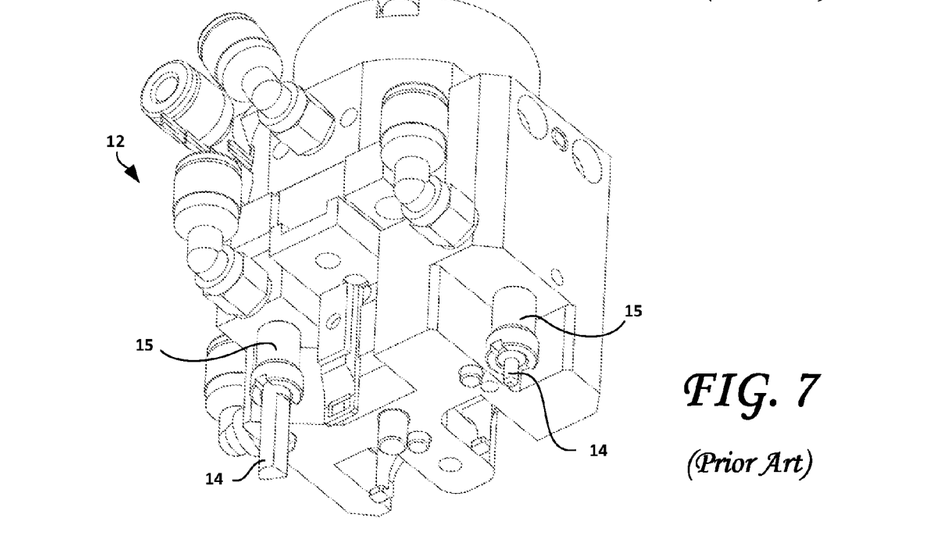
FIG. 7 shows a conventional gripper assembly with integrated plunger pins.

FIG. 1 shows a conventional hard disk drive assembly nest 10, used during the manufacture of hard disk drives. Conventionally, the top VCM plate 60 is installed using a conventional top VCM plate gripper assembly 12 mounted on a pneumatic gantry that picks and places the top VCM plate 60 plate into the head disk assembly. Conventionally, the mechanism for holding down the bottom VCM plate 56 is integrated into this top VCM plate gripper assembly 12, as shown in FIG. 5. With reference now to FIGS. 5, 6 and 7, this conventional hold-down mechanism integrated into the top VCM gripper assembly 12 includes hold-down plunger pins 14. The hold-down plunger pins 14 are conventionally spring-loaded by springs within spring cylinders 15. Strong spring forces on the plunger pins 14 are necessary to hold down the bottom VCM plate 56 that has high magnetic attraction towards the top VCM plate 60 during the installation process. The force exerted on the bottom VCM plate 56 by the magnet attached to the top VCM plate 60 is so strong that the long and weak plunger pins 14 frequently break under the strain. In addition, a spring fatigue phenomenon (loss of resiliency of the springs within the spring cylinders 15) renders this conventional spring-loaded plunger pin design inconsistent and ineffective in effectively and consistently holding down the bottom VCM plate 56. In turn, as alluded to above, when the force exerted on the bottom VCM plate 56 exceeds the force applied thereto by the plunger pins 14 of the top VCM plate gripper assembly 12 and causes it to lift from the base, the bottom VCM plate 56 contacts and transfers a moment to the coil assembly 52, thereby tilting the pivot bearing cartridge 42 away from its axis 48 and causing irremediable damage to the constituent bearings thereof and thus to the drive itself. Because of this damage, drive performance and assembly yield suffer. Therefore, the conventional design is not sustainable and has proven to be ineffective in high volume production.

What are needed, therefore, are devices and methods for manufacturing disk drives that do not suffer from the above-described disadvantages.

SUMMARY OF THE INVENTION

An embodiment of the present inventions is a device for preventing damage to a pivot bearing assembly during manufacture of a hard disk drive. The device may include a first bottom voice coil motor (VCM) plate hold-down clamp configured to clamp down on a first exposed surface of a bottom VCM plate of the hard disk drive and a second bottom VCM plate hold-down clamp configured to clamp down on a second exposed surface of the bottom VCM plate. The first and second bottom VCM plate hold-down clamps are configured to prevent damage to the pivot bearing assembly during installation of a top VCM plate over the bottom VCM plate by clamping down on the bottom VCM plate with a force that is at least sufficient to prevent the bottom VCM plate from moving when the top VCM plate is installed over the bottom VCM plate. Each of the first and second bottom VCM plate hold-down clamps may be configured to be rotatable in a first plane and movable along a second plane.

According to further embodiments, the first bottom VCM plate hold-down clamp may be independently rotatable and movable relative to the second bottom VCM plate hold-down clamp. The first plane may be substantially perpendicular to the second plane. A free end of the first bottom VCM plate hold-down clamp may include a first capping feature of a relatively softer material than the first and second exposed surfaces of the bottom VCM plate. A free end of the second bottom VCM plate hold-down clamp may include a second capping feature of the relatively softer material. The relatively softer material may include a polymer such as, for example, a polyetheretherketone. The first bottom VCM plate hold-down clamp may include a first head disk assembly (HDA) clamp for clamping an HDA of the hard disk drive in place. The second bottom VCM plate hold-down clamp may include a second HDA clamp for clamping the HDA in place. The device may further include a first Y-shaped bearing assembly configured to guide the first bottom VCM plate hold-down clamp to the first exposed surface of the bottom VCM plate and a second Y-shaped bearing assembly configured to guide the second bottom VCM plate hold-down clamp to the second exposed surface of the bottom VCM plate. The device may further include a first pneumatic assembly configured to actuate the first bottom VCM plate hold-down clamp and a second pneumatic assembly configured to actuate the second bottom VCM plate hold-down clamp.

Yet another embodiment of the present inventions is a method for manufacturing a disk drive comprising a head disk assembly (HDA) including a bottom voice coil motor (VCM) plate coupled thereto and a head stack assembly (HSA) including a pivot bearing cartridge. The method may include steps of coupling the pivot bearing assembly to the HDA; clamping, using a first bottom voice coil motor (VCM) plate hold-down clamp, a first exposed surface of the bottom VCM plate, the first bottom VCM plate hold-down clamp being selectively rotatable in a first plane and movable along a second plane; and clamping, using a second bottom VCM plate hold-down clamp, a second exposed surface of the bottom VCM plate. The second bottom VCM plate hold-down clamp may be selectively rotatable in the first plane and movable along the second plane. The clamping steps prevent damage to the pivot bearing assembly during subsequent installation of a top VCM plate over the bottom VCM plate by clamping down on the bottom VCM plate with a force that is at least sufficient to prevent the bottom VCM plate from moving when the top VCM plate is subsequently installed over the bottom VCM plate.

The clamping steps may be carried out with the first bottom VCM plate hold-down clamp being independently rotatable and movable relative to the second bottom VCM plate hold-down clamp. The first plane may be substantially perpendicular to the second plane. The clamping steps may be carried out with a free end of the first bottom VCM plate hold-down clamp including a first capping feature of a relatively softer material than the first and second exposed surfaces of the bottom VCM plate. A free end of the second bottom VCM plate hold-down clamp may include a second capping feature of the relatively softer material. The relatively softer material may include a plastic such as, for example, a polyetheretherketone. The first bottom VCM plate hold-down clamp may include a first head disk assembly (HDA) clamping portion and the second bottom VCM plate hold-down clamp may include a second HDA clamping portion. The clamping steps may include steps of clamping the HDA in place using the first and second HDA clamping portions. The clamping steps may be carried out with the first bottom VCM plate hold-down clamp comprising a first Y-shaped bearing assembly configured to guide the first bottom VCM plate hold-down clamp to the first exposed surface of the bottom VCM plate and with the second bottom VCM plate hold-down clamp comprising a second Y-shaped bearing assembly configured to guide the second bottom VCM plate hold-down clamp to the second exposed surface of the bottom VCM plate. The clamping steps may include pneumatically actuating the first bottom VCM plate hold-down clamp the second bottom VCM plate hold-down clamp.

Another embodiment of the present inventions is an assembly nest for assembly of a hard disk drive. The assembly nest may include a bottom voice coil motor (VCM) hold-down clamping assembly configured to clamp down on at least one exposed surface of a bottom VCM plate of the hard disk drive, and a top VCM plate gripper assembly that is separate from the bottom VCM hold-down clamping assembly and that is configured to place a top VCM plate of the hard disk drive over the bottom VCM plate. The bottom VCM hold-down clamping assembly may be independently movable with respect to the top VCM plate gripper assembly and the top VCM plate gripper assembly may be independently movable with respect to the bottom VCM hold-down clamping assembly. The bottom VCM hold-down clamping assembly may include a first bottom VCM plate hold-down clamp and a second bottom VCM plate hold-down clamp, each of the first and second bottom VCM plate hold-down clamps being independently rotatable and movable relative to one another. The bottom VCM hold-down clamping assembly may include at least one free end configured to contact the bottom VCM plate, the at least one free end may include a capping feature of a relatively softer material than a material of the bottom VCM plate. The relatively softer material may include a polymer such as, for example, a polyetheretherketone. The bottom VCM plate hold-down clamping assembly may include at least one head disk assembly (HDA) clamping portion, the at least one HDA clamping portion being configured to clamp an HDA of the disk drive in place. The assembly nest may further include at least one Y-shaped bearing assembly configured to guide the bottom VCM plate hold-down clamping assembly to at least one exposed surface of the bottom VCM plate. The assembly nest may also include a pneumatic actuating assembly configured to actuate the bottom VCM plate hold-down clamping assembly.

DESCRIPTION OF THE PREFERRED EMBODIMENTS

Figure 8:
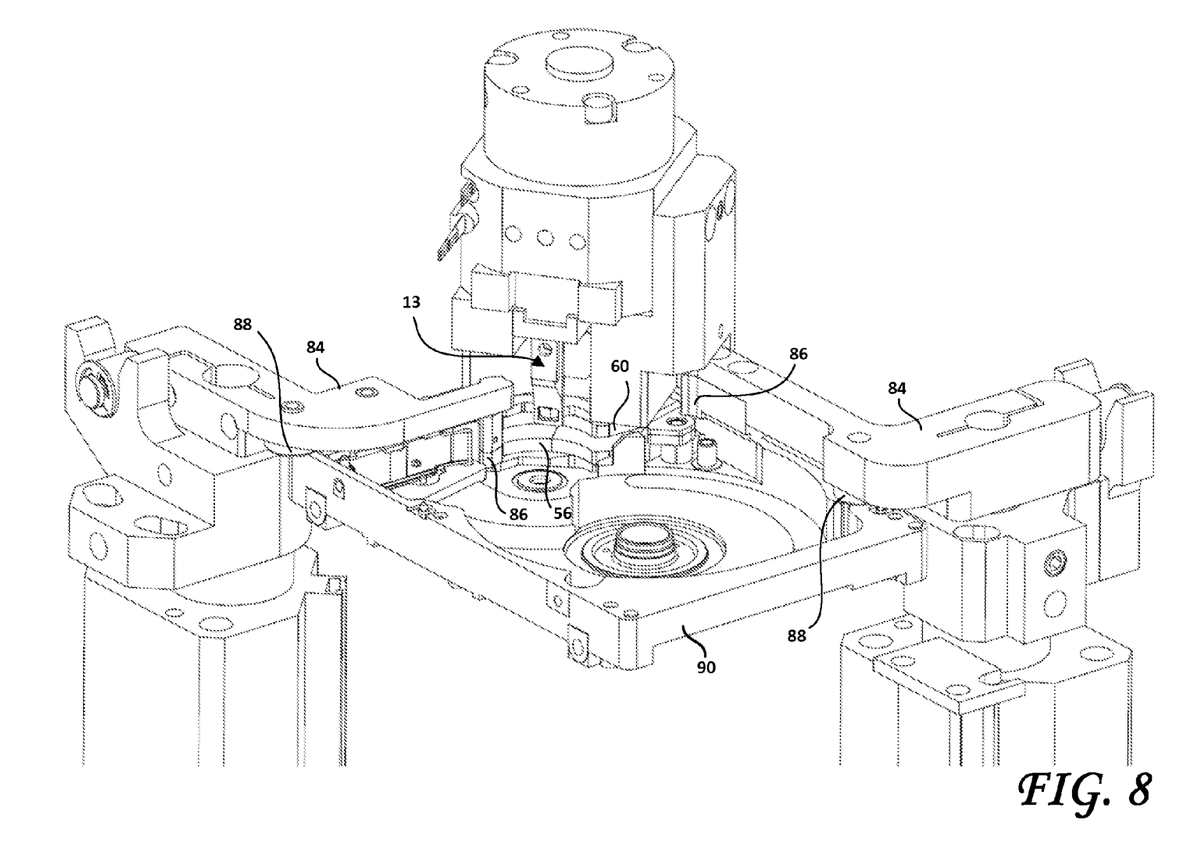
FIG. 8 shows a device for preventing damage to a pivot bearing assembly during manufacture of a disk drive, according to embodiments of the present inventions.
Figure 9:
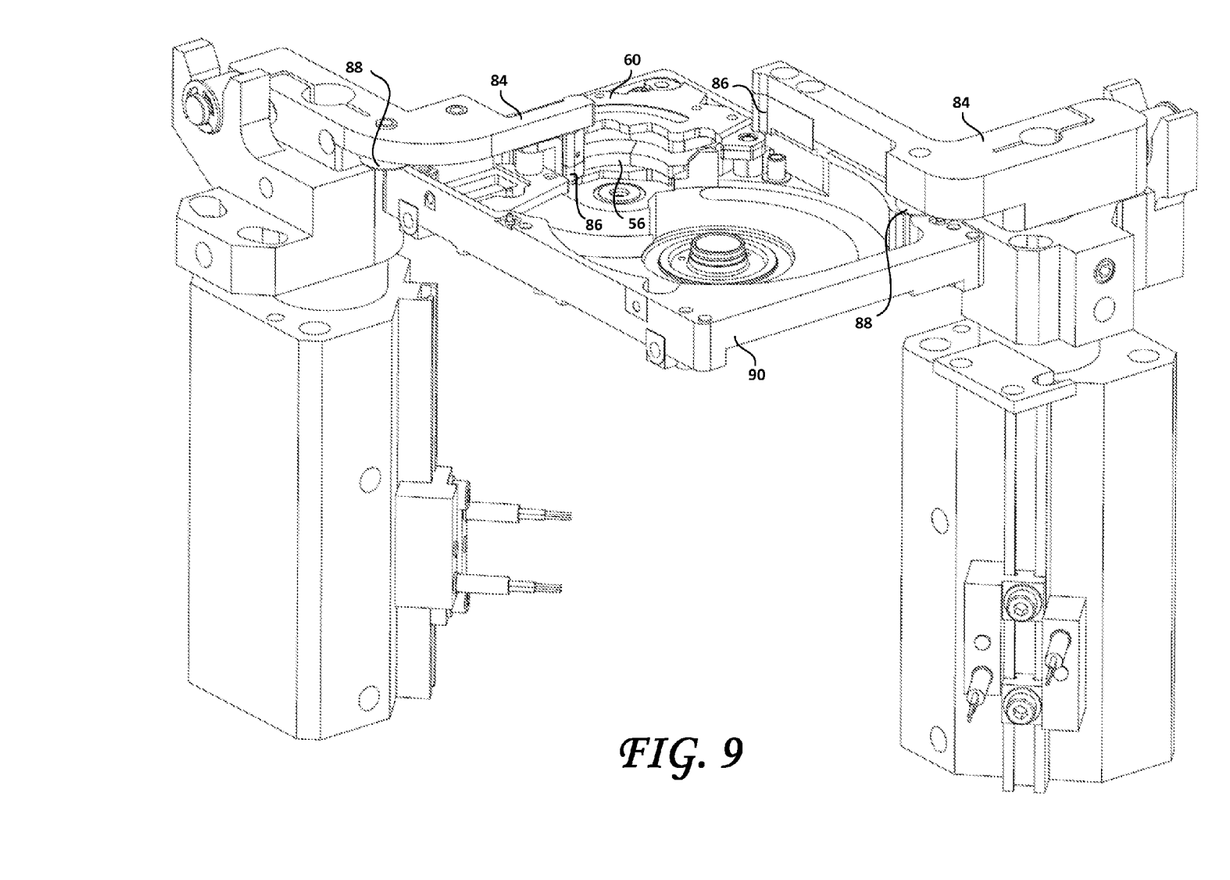
FIG. 9 shows another view of the device of FIG. 8, to illustrate further aspects of embodiments of the present inventions.
Figure 10:
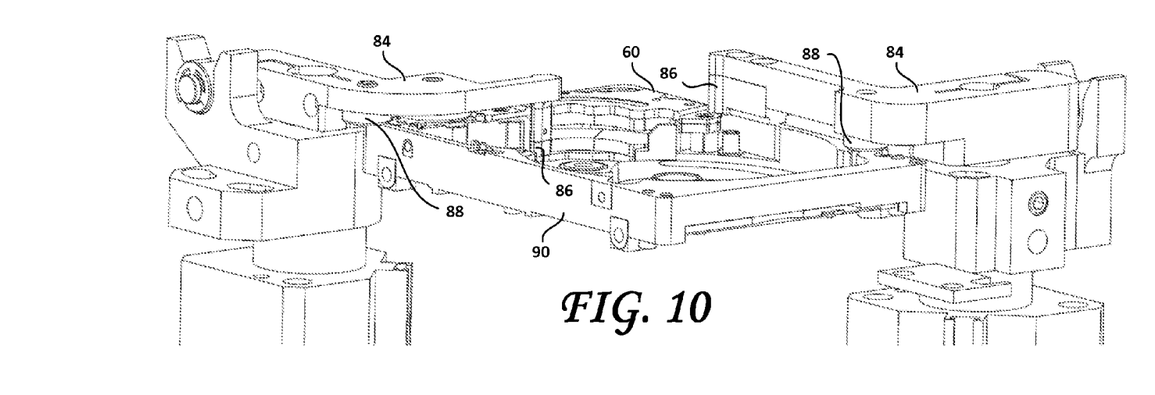
FIG. 10 shows further details of the device of FIG. 8, according to embodiments of the present inventions.
Figure 11:
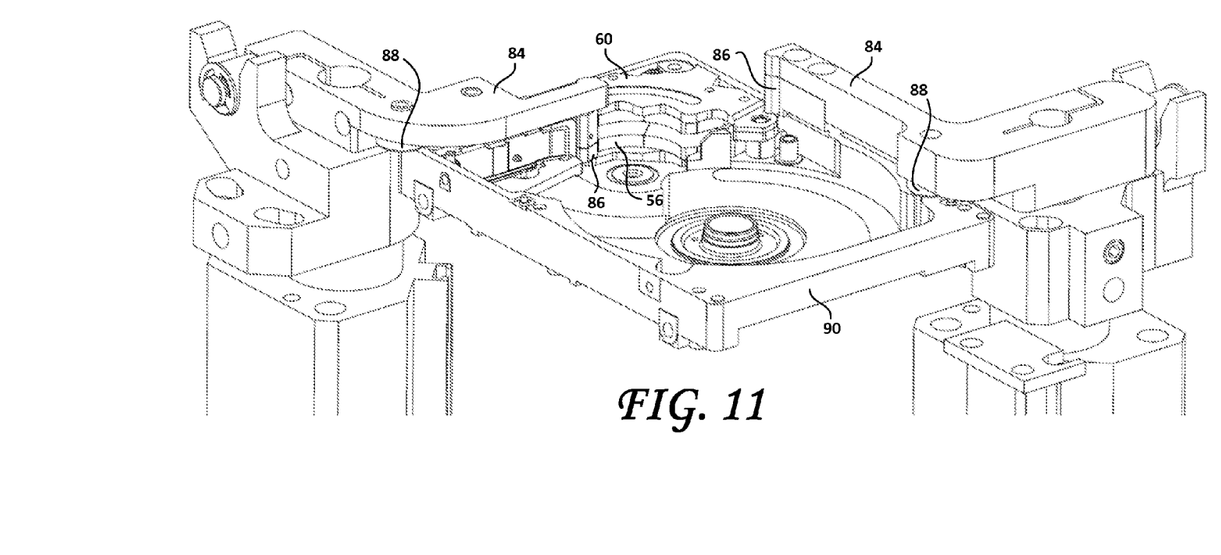
FIG. 11 is a view of the device of FIG. 8 in a state in which the first and second bottom VCM plate hold-down clamps are in a clamped configuration, according to embodiments of the present inventions.
Figure 12:
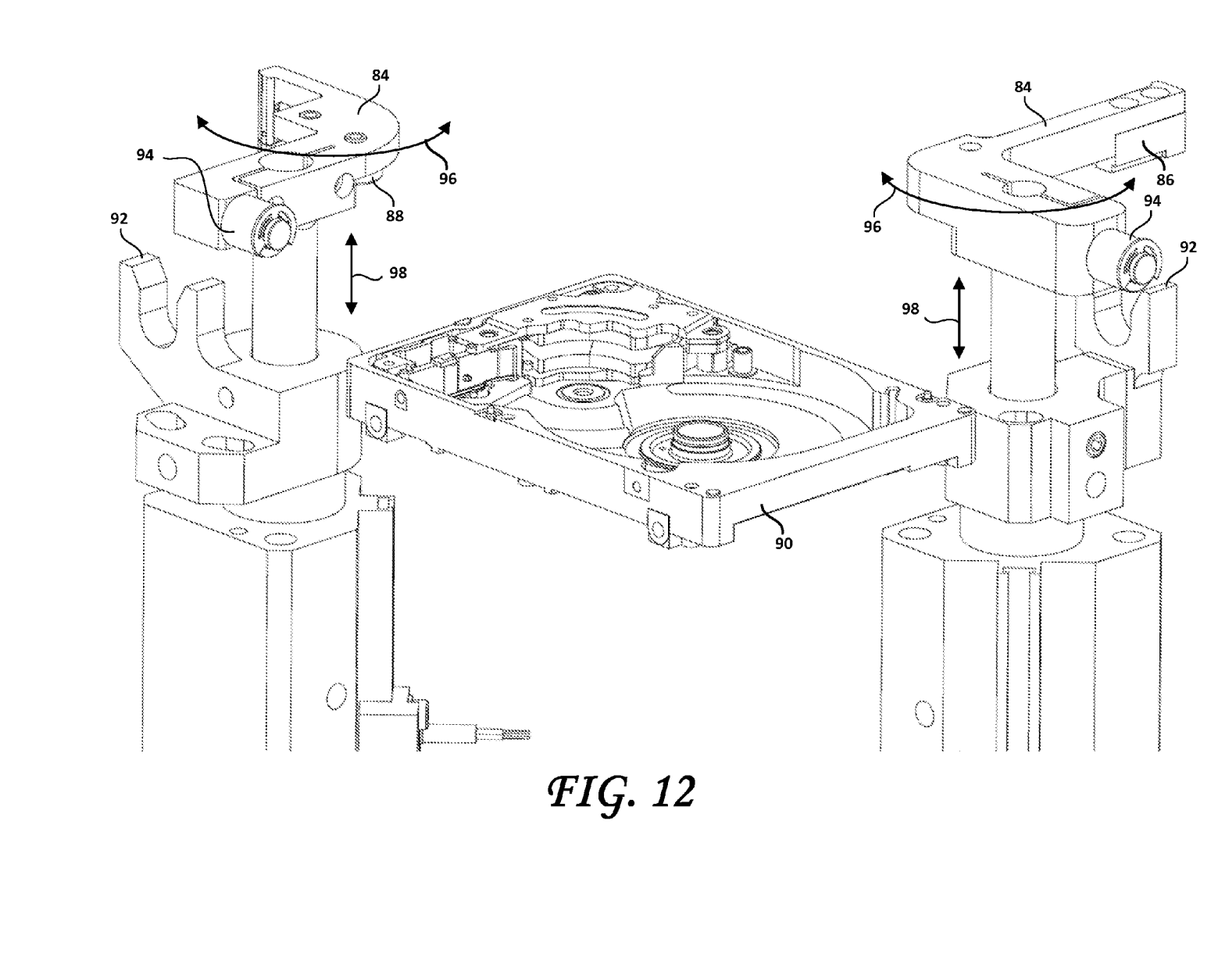
FIG. 12 is a view of the device of FIG. 8 in a state in which the first and second VCM plate hold-down clamps are in an unclamped configuration, illustrating that both first and second bottom VCM hold-down clamps may be configured to be rotatable in a first plane and movable along a second plane, according to embodiments of the present inventions.

FIGS. 8-12 show embodiments of the present inventions. For clarity of illustration, the table 11 of the hard drive assembly nest 10 (shown in FIG. 1) is omitted from these figures, as are other ancillary components thereof whose depiction in the figures do not contribute to the description of the present detailed description of the present embodiments. The top VCM gripper assembly 13, shown in FIG. 8, is omitted from FIGS. 9-12, again for clarity of illustration. Unlike the conventional top VCM plate gripper assembly 12 with its integrated plunger pins 14, embodiments of the present inventions separate the structures and associated functionality of the top VCM plate gripper assembly (i.e., to pick and place the top VCM plate 60) and the functions of the bottom VCM plate hold-down mechanism. According to embodiments of the present inventions, a bottom VCM plate hold-down clamping assembly, separate from the top VCM gripper assembly, is provided and configured to clamp down on one or more exposed surfaces of a bottom VCM plate of the hard disk drive being assembled. According to an embodiment of the present inventions, the bottom VCM plate hold-down clamping assembly may include a first bottom VCM plate hold-down clamp 84 that is configured to clamp down on a first exposed surface of the hard disk drive being assembled and may include a second bottom VCM plate hold-down clamp 84 that is configured to clamp down on a second exposed surface of the hard disk drive being assembled. As shown in FIG. 12, the first and second bottom VCM hold-down clamps 84 may be configured to be rotatable in a first plane 96 (e.g., horizontally, parallel to the major surface of the base 90 of the disk drive under assembly) and movable along a second plane 98 (e.g., vertically, orthogonal the first plane 96 and to the major surface 90 of the disk drive under assembly), and to do so independently of one another. The first and second bottom VCM hold-down clamps 84, in this manner, may be actuated (pneumatically, for example), to move from a first position shown in FIG. 12 in which they do not contact the drive being assembled and a second position shown in FIGS. 8-11, in which the first and second bottom VCM hold-down clamps 84 push down (exert a force on) on the first and second exposed surfaces, respectively, of the bottom VCM plate 56 of the hard disk drive being assembled. The phrases "exposed surface" and "exposed surfaces", in this context, denote surfaces of the bottom VCM plate 56 that may be pushed down upon by the first and second bottom VCM hold-down clamps 84 without interfering with subsequent assembly steps such as, for example, steps carried out for the installation of the HSA 40 and of the top VCM plate 60. Moreover, the terms "clamp" and "clamping", within the present context, denote any of various devices or structural configurations used to join, grip, support, exert a force on or compress a mechanical or structural part or parts, such as the bottom VCM plate 56.

The first and second bottom VCM hold-down clamps 84 may include thick and heavy arm sections and be fabricated of formed of a material suitable for high yield clean-room manufacturing such as, for example, stainless steel. The dimensions and shape of the first and second bottom VCM hold-down clamps 84 may be selected as needed to ensure that they will not deform or yield when placed under load such as when the top VCM plate 60 is lowered over the coil assembly 52 and the bottom VCM plate 56 and such that they will not impede the subsequent disk drive assembly steps. Also, the first and second bottom VCM hold-down clamps 84 may be shaped and articulated as needed to render them susceptible to being readily swung or otherwise moved out of the way when no longer needed; namely, after the installation of the top VCM plate 60, for example. Therefore, it is to be noted that the configuration and shape of the bottom VCM hold-down clamping assembly in general and of the first and second bottom VCM hold-down clamps 84 in particular (shown in FIGS. 8-12) is but one of many possible configurations of the bottom VCM hold-down clamping assembly and of the first and second bottom VCM hold-down clamps 84 and that other shapes and configurations are possible, commensurate with the stated functionality of this assembly and these elements, as described herein.

According to embodiments of the present inventions, the first and second bottom VCM hold-down clamps 84 rotate and clamp down on first and second bottom VCM plate exposed surfaces while the top VCM plate gripper assembly 13 (shown in FIG. 8 only) engages the top VCM plate 60 with the bottom VCM plate 56 in the HDA. It is to be noted that the top VCM plate gripper assembly 13 of FIG. 8, unlike the top VCM plate gripper assembly 12 of FIG. 1, does not include the plunger pins 14 most clearly shown in FIG. 7, as the top VCM plate gripper assembly 13, according to embodiments of the present inventions, does not include structures or any functionality to push, clamp or bear down on the bottom VCM plate 56, as do the prior art configuration shown and described relative to FIG. 1. According to embodiments of the present inventions, during engagement, the top VCM plate 60 is controllably lowered over the bottom VCM plate 56 by the top VCM plate gripper assembly 13, without allowing any significant movement of the bottom VCM plate 56 due to the magnetic attractive force occasioned by the presence of the strong permanent magnet coupled to the top VCM plate 60 in close proximity thereto. The first and second bottom VCM hold-down clamps 84 may be pneumatically actuated and are configured to exert a force on the bottom VCM plate 56 that is sufficient to at least overcome the attractive force induced by the interaction of the magnetic fields of the first and second magnets 54 and 58. According to embodiments of the present inventions, the bottom VCM hold-down clamping assembly may also include HDA clamps that are operative to clamp down on the base casting 90 of the HDA, to thereby ensure that neither the bottom VCM plate 56 nor the base casting 90 of the HDA move during installation of the top VCM plate 60. Such HDA clamps are shown at reference numeral 88 on each of the first and second bottom VCM plate hold-down clamps 84. In use, the HDA clamps 88 exert a force on the base casting 90 of the HDA that is directed toward the table 11, thereby compressing the base casting 90 between the structures 88 and the table 11 of the present disk drive assembly nest and maintaining it substantially immobile, at least during the installation of the top VCM plate 60.

According to embodiments of the present inventions, each of the first and second bottom VCM plate hold-down clamps 84 may take the form of two stainless steel arms having, for example, two or more degrees of freedom. A free end of a portion of each of the bottom VCM hold-down clamps 84, in use, extends toward the bottom VCM plate 56. That free end of the extending portion may be capped or otherwise provided with a capping feature 86 made of or including a relatively softer material than the first and second exposed surfaces of the bottom VCM plate 56. The capping feature 86, provided on the free end of each of the extending portions of the first and second bottom VCM hold-down clamps 84, is configured to make contact with the corresponding first and second exposed surfaces of the bottom VCM plate 56. The capping features 86, which may be made of or otherwise include a polymeric material (e.g., a plastic), are configured to prevent the formation of metallic particulates and to prevent the formation of dent marks on the bottom VCM plate 56 during the clamping and top VCM plate installation processes. The polymeric material should be relatively hard and/or have sufficient dimensional stability to prevent particles from shedding, as well as to withstand rigorous impacts with the bottom VCM plate 56. Suitably, the material for the capping features 86, therefore, may be or include, for example a super hard, conduction or static dissipative polymeric material such as PEEK CA30 (30% carbon-filled PEEK). PEEK is a family of thermoplastic resins, a polyetheretherketone. The bottom VCM hold-down clamps 84, as well as the extending portions thereof, may be shaped to maximize body mass to improve robustness, and to provide precision guiding to control clamping accuracy and repeatability, as compared to the fragile spring loaded plunger pins 14 used in conventional designs. Advantageously, the HDA clamps 88 may also be formed of or include the same polymeric material as the capping features 86.

The bottom VCM plate hold-down clamping assembly may include at least one Y-shaped bearing assembly. The Y-shaped bearing assembly may include a Y-shaped bearing guide 92 that is configured to receive a corresponding bearing 94 of the bottom VCM plate hold-down clamping assembly. According to an embodiment of the present inventions, the Y-shaped bearing assembly may include a first Y-shaped bearing guide 92 that is configured to receive a corresponding first bearing 94 of the first bottom VCM hold-down clamp 84. The Y-shaped bearing assembly may also include a second Y-shaped bearing guide 92 that is configured to receive a corresponding second bearing 94 of the second bottom VCM hold-down clamp 84. The constituent elements of the Y-shaped bearing assembly are configured to enable movement of the first and second bottom VCM hold-down clamps 84, and to ensure accuracy and repeatability of the hold-down location (the exposed surface areas of the bottom VCM plate 56), which are confined within very tight spaces. Precision and repeatability are essential to prevent interference between the hold-down features and the other HDA internal components, which interference may create contamination and hence head degradation in the HDA.

Embodiments of the present inventions reliably resolve the bottom VCM plate movement issue, ensuring that bottom VCM plate 56 is rigidly held down throughout the top VCM plate installation process, hence eliminating any possibility of damage to the pivot bearing cartridge 42 during installation of the top VCM plate 60. Embodiments of the present inventions also provide design robustness, precision, accuracy, repeatability, cleanliness, material and features that collectively prevent damage to contact surfaces of the bottom VCM plate 56. In turn, this improves overall product yield that would otherwise be degraded through damage to pivot bearing cartridges 42 during the installation of the top VCM plate 60 in the HDA. Embodiments of the present inventions also reduce scrap cost by reducing the number of damaged pivot bearings 42, and correspondingly increases the quality of the hard drives constructed in accordance with the devices and methods shown and described herein. Upgrading of conventional hard drive assembly nest 10 to hard drive assembly nests according to embodiments of the present inventions (as shown in FIGS. 8-12) may be carried out by swapping out the convention top VCM plate gripper assembly 12 for a top VCM plate gripper assembly 13 (FIG. 8) without the spring-loaded plunger pins 14 and the functionality associated therewith and installing the present bottom VCM hold-down clamping assembly and the Y-shaped bearing assembly. Such substitutions and installations result in a hard drive assembly nest according to embodiments of the present inventions, as having all of the features and advantages described herein.

While certain embodiments of the inventions have been described, these embodiments have been presented by way of example only, and are not intended to limit the scope of the inventions. Indeed, the novel methods, devices and systems described herein may be embodied in a variety of other forms. Furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions. For example, those skilled in the art will appreciate that in various embodiments, the steps taken in the processes and the structures implemented may differ from those shown in FIGS. 8-12. Depending on the embodiment, certain of the steps described in the example above may be removed, others may be added, and the sequence of steps may be altered and/or performed in parallel. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

The invention claimed is:

1. An assembly nest for assembly of a hard disk drive, comprising:
   a first bottom voice coil motor (VCM) hold-down clamping assembly configured to:

rotate in a first plane parallel to a base of the hard disk drive;
move in a second plane perpendicular to the base of the hard disk drive; and
clamp down on at least one first exposed surface of a bottom VCM plate of the hard disk drive;
a top VCM plate gripper assembly that is separate from the first bottom VCM hold-down clamping assembly and that is configured to place a top VCM plate of the hard disk drive over the bottom VCM plate, and
wherein the first bottom VCM hold-down clamping assembly is independently rotatable in the first plane and movable in the second plane with respect to the top VCM plate gripper assembly and wherein the top VCM plate gripper assembly is independently movable with respect to the first bottom VCM hold-down clamping assembly.

2. The assembly nest of claim 1, further comprising a second bottom VCM hold-down clamping assembly configured to, independently of the first bottom VCM hold-down clamping assembly and independently of the top VCM plate gripper assembly:
rotate in the first plane parallel to a base of the hard disk drive and
move in the second plane perpendicular to the base of the hard disk drive clamp down on at least one second exposed surface of the bottom VCM plate of the hard disk drive.

3. The assembly nest of claim 2, further including a second Y-shaped bearing assembly configured to guide the second bottom VCM plate hold-down clamping assembly to the at least one second exposed surface of the bottom VCM plate.

4. The assembly nest of claim 1, wherein the first bottom VCM hold-down clamping assembly includes at least one free end configured to contact the bottom VCM plate, the at least one free end including a capping feature of a relatively softer material than a material of the bottom VCM plate.

5. The assembly nest of claim 4, wherein the relatively softer material includes a polymer.

6. The assembly nest of claim 5, wherein the polymer includes a polyetheretherketone.

7. The assembly nest of claim 1, wherein the first bottom VCM plate hold-down clamping assembly includes at least one head disk assembly (HDA) clamping portion, the at least one HDA clamping portion being configured to clamp an HDA of the disk drive in place.

8. The assembly nest of claim 1, further including a first Y-shaped bearing assembly configured to guide the first bottom VCM plate hold-down clamping assembly to the at least one first exposed surface of the bottom VCM plate.

9. The assembly nest of claim 1, further including a pneumatic actuating assembly configured to actuate the first bottom VCM plate hold-down clamping assembly.

* * * * *